(12) United States Patent
Morioka et al.

(10) Patent No.: US 12,506,170 B2
(45) Date of Patent: Dec. 23, 2025

(54) BATTERY STACK PLATE AND METHOD FOR MANUFACTURING BATTERY STACK PLATE

(71) Applicants: YAZAKI CORPORATION, Tokyo (JP); TOYOTA JIDOSHA KABUSHIKI KAISHA, Aichi-ken (JP); KABUSHIKI KAISHA TOYOTA JIDOSHOKKI, Kariya (JP)

(72) Inventors: Satoshi Morioka, Aichi-ken (JP); Motoyoshi Okumura, Aichi-ken (JP); Hiromi Ueda, Kariya (JP); Naoto Morisaku, Kariya (JP); Hirotaka Hasegawa, Kakegawa (JP); Shinichi Yanagihara, Kakegawa (JP)

(73) Assignees: YAZAKI CORPORATION, Tokyo (JP); TOYOTA JIDOSHA KABUSHIKI KAISHA, Aichi-ken (JP); KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 524 days.

(21) Appl. No.: 18/183,701

(22) Filed: Mar. 14, 2023

(65) Prior Publication Data
US 2023/0335779 A1 Oct. 19, 2023

(30) Foreign Application Priority Data

Apr. 13, 2022 (JP) .................................. 2022-066584

(51) Int. Cl.
*H01M 10/04* (2006.01)
*H01M 10/48* (2006.01)
*H01M 50/209* (2021.01)
*H01M 50/289* (2021.01)
*H01M 50/291* (2021.01)
(Continued)

(52) U.S. Cl.
CPC ....... *H01M 10/0413* (2013.01); *H01M 10/48* (2013.01); *H01M 10/486* (2013.01); *H01M 50/209* (2021.01); *H01M 50/289* (2021.01); *H01M 50/291* (2021.01); *H01M 50/503* (2021.01); *H01M 50/569* (2021.01)

(58) Field of Classification Search
None
See application file for complete search history.

(56) References Cited

U.S. PATENT DOCUMENTS

2022/0349922 A1* 11/2022 Okazaki ............... G01R 31/364
2022/0349923 A1* 11/2022 Morioka .................. G01R 1/04
2022/0349945 A1* 11/2022 Morioka ............. H01M 10/482
(Continued)

FOREIGN PATENT DOCUMENTS

JP 2020-198211 A 12/2020

*Primary Examiner* — Jonathan Crepeau
(74) *Attorney, Agent, or Firm* — Sughrue Mion, PLLC

(57) ABSTRACT

A battery stack plate including a housing is provided. The housing has a first sub housing and a second sub housing. Each of the first and second sub housings has a coupling portion coupling the first and second sub housings to each other. The coupling portion includes a protruding portion provided on a coupling plate side face on which the first sub housing and the second sub housing are coupled to each other, and a recessed portion provided on the coupling plate side face at a position shifted from the protruding portion in the up-down direction.

6 Claims, 9 Drawing Sheets

(51) Int. Cl.
*H01M 50/503* (2021.01)
*H01M 50/569* (2021.01)

(56) References Cited

U.S. PATENT DOCUMENTS

| | | | | |
|---|---|---|---|---|
| 2022/0349946 A1* | 11/2022 | Morioka | ............... | H01M 10/48 |
| 2022/0352567 A1* | 11/2022 | Morioka | ............. | H01M 10/482 |
| 2022/0352578 A1* | 11/2022 | Morioka | ............. | H01M 50/103 |
| 2022/0352587 A1* | 11/2022 | Okazaki | ............. | H01M 50/593 |
| 2022/0352608 A1* | 11/2022 | Okazaki | ............. | H01M 50/593 |

* cited by examiner

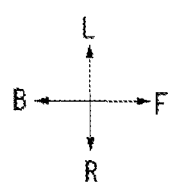

BATTERY STACK PLATE AND METHOD FOR MANUFACTURING BATTERY STACK PLATE

CROSS-REFERENCE TO RELATED APPLICATIONS

This application is based on and claims priority under 35 USC 119 from Japanese Patent Application No. 2022-066584 filed on Apr. 13, 2022, the entire content of which is incorporated herein by reference.

TECHNICAL FIELD

The present disclosure relates to a battery stack plate and a method for manufacturing the battery stack plate.

In related art, various power storage devices are proposed, for example, a power storage device disclosed in Patent Literature 1 includes a plurality of stacked power storage modules and a plurality of plate-shaped members (conductive modules) disposed between the power storage modules. When the plurality of power storage modules and the plurality of plate-shaped members are disposed between a pair of insulating plates, a restraining force is applied by a restraining member, so that the plurality of power storage modules and the plurality of plate-shaped members constitute a stacked body (battery stack) formed in a substantially rectangular parallelepiped shape.

The plate-shaped member includes a cooling plate (conductive plate) and an insulating portion (battery stack plate). The cooling plate is disposed between the insulating portion and the insulating portion.

CITATION LIST

Patent Literature

Patent Literature 1: JP2020-198211A

SUMMARY

The above-described battery stack plate includes a voltage detection unit that accommodates a voltage detection terminal, a temperature detection unit that accommodates a temperature sensor, a voltage and temperature detection unit that accommodates both the voltage detection terminal and the temperature sensor, and a dummy unit that accommodates nothing, and these unit are selectively stacked according to specifications of the battery stack. In particular, in the case of the voltage detection unit or the temperature sensor, a direction in which an electric wire connected to the voltage detection terminal or the temperature sensor is pulled out is also determined by a specification of a battery unit.

Therefore, when the specification of the battery stack is changed or the like, there is a problem that a unit in which the direction in which the electric wire is pulled out is different is required, versatility is low, and it is not possible to cope with the specifications of various battery stacks.

The present disclosure has been made in view of the above circumstances, and an object of the present disclosure is to provide a battery stack plate that is highly versatile and can cope with various specifications of battery stacks and a method for manufacturing the battery stack plate.

In order to achieve the above object, a battery stack plate according to the present invention is characterized as follows.

The battery stack plate includes a plate-shaped housing in which a fitting groove is provided in a side plate surface, the fitting groove being configured to fit a side edge portion of a conductive plate disposed between a plurality of stacked power storage modules.

The housing includes a first sub housing and a second sub housing that are obtained by dividing the housing into two in an intersecting direction intersecting with both a fitting direction and a plate thickness direction. The first sub housing and the second sub housing each have a coupling portion that couples the first sub housing and the second sub housing to each other.

The coupling portion includes a protruding portion provided on a coupling plate side face on which the first sub housing and the second sub housing are coupled to each other, and a recessed portion provided on the coupling plate side face at a position shifted from the protruding portion in the plate thickness direction.

The protruding portion arranged on the second sub housing is inserted into the recessed portion arranged on the first sub housing, and the protruding portion arranged on the first sub housing is inserted into the recessed portion arranged on the second sub housing to couple the first sub housing and the second sub housing.

Further, in order to achieve the above object, a battery stack plate according to the present invention is characterized as follows.

The battery stack plate includes a plate-shaped housing in which a fitting groove is provided in a side plate surface, the fitting groove being configured to fit a side edge portion of a conductive plate disposed between a plurality of stacked power storage modules.

The housing includes a first sub housing and a second sub housing that are obtained by dividing the housing into two in an intersecting direction intersecting with both a fitting direction and a plate thickness direction.

The first sub housing and the second sub housing each have a coupling portion that couples the first sub housing and the second sub housing to each other.

The first sub housing and the second sub housing include any one of a voltage detection housing having a terminal accommodation recessed portion that accommodates a voltage detection terminal to be conductively connected to the conductive plate, an electric wire accommodation recessed portion that accommodates an electric wire to be conductively connected to the voltage detection terminal, and a pull-out port from which the electric wire is pulled out to the outside, a temperature detection housing having a sensor accommodation portion that accommodates a temperature sensor, and a dummy housing in which none of the voltage detection terminal, the electric wire, and the temperature sensor is accommodated.

Furthermore, in order to achieve the above object, a method for manufacturing a plate-shaped battery stack plate according to the present invention is characterized as follows.

In the battery stack plate, a fitting groove is provided in a side plate surface. The fitting groove is configured to fit a side edge portion of a conductive plate disposed between a plurality of stacked power storage modules.

The method for manufacturing the battery stack plate includes manufacturing a voltage detection housing having a terminal accommodation recessed portion that accommodates a voltage detection terminal to be conductively connected to the conductive plate, an electric wire accommodation recessed portion that accommodates an electric wire to be conductively connected to the voltage detection terminal, and a pull-out port from which the electric wire is pulled out to the outside, a temperature detection housing having a sensor accommodation portion that accommodates a temperature sensor, and a dummy housing in which none of the voltage detection terminal, the electric wire, and the temperature sensor is accommodated; and selecting two housings from the voltage detection housing, the temperature detection housing, and the dummy housing, and coupling the two selected housings in an intersecting direction intersecting with both a fitting direction and a plate thickness direction.

According to the present disclosure, it is possible to provide a battery stack plate that is highly versatile and can cope with various specifications of battery stacks and a method for manufacturing the battery stack plate.

The present disclosure has been briefly described above. Further, details of the present disclosure will be further clarified by reading through a mode for carrying out the invention described below (hereinafter referred to as an "embodiment") with reference to the accompanying drawings.

BRIEF DESCRIPTION OF DRAWINGS

Exemplary embodiment(s) of the present invention will be described in detail based on the following figures, wherein.

DESCRIPTION OF EMBODIMENTS

Hereinafter, a stacked battery stack including a battery stack plate according to an embodiment of the present disclosure will be described with reference to the drawings.

Figure 1:
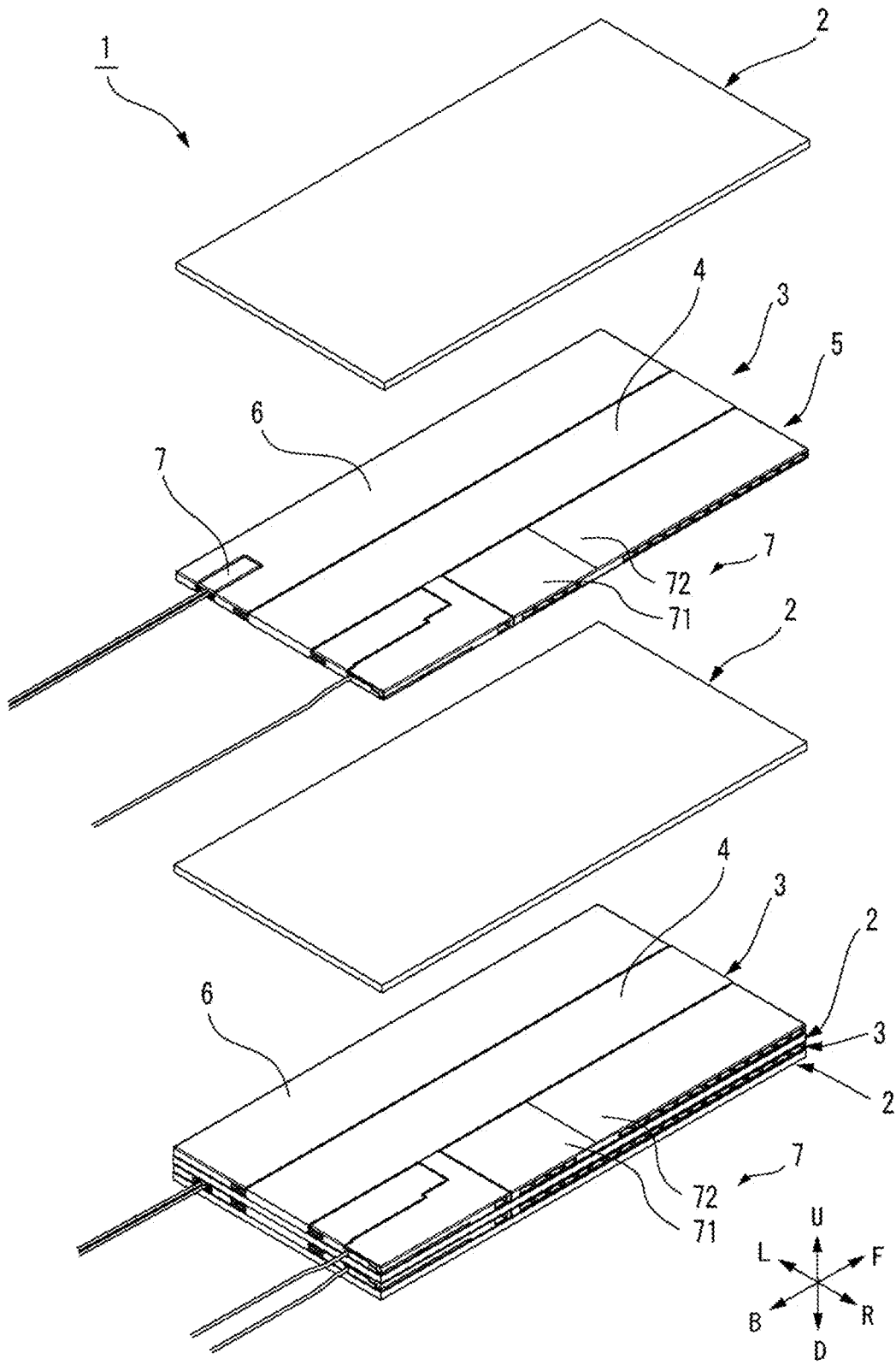
FIG. 1 is a partially exploded perspective view of a stacked battery stack including a battery stack plate according to an embodiment of the present disclosure.

Hereinafter, for convenience of description, as shown in FIG. 1 and the like, a "front-back direction (FB direction)", a "left-right direction (RL direction)", an "up-down direction (UD direction)", a "front (F)", a "back (B)", a "left (L)", a "right (R)", an "upper (U)", and a "down (D)" are defined. The "front-back direction", the "left-right direction", and the "up-down direction" are orthogonal to each other.

A conductive module 3 including battery stack plates 5 and 6 is typically used in a stacked battery stack 1 shown in FIG. 1. The battery stack 1 is formed by alternately stacking, in the up-down direction, rectangular thin plate-shaped power storage modules 2 capable of charging and discharging and rectangular thin plate-shaped conductive modules 3 capable of electrically connecting adjacent power storage modules 2. In the battery stack 1, a plurality of power storage modules 2 are electrically connected in series via the conductive modules 3. The power storage module 2 has a structure in which a plurality of battery cells (not shown) are incorporated, and the power storage modules 2 as a whole function as one battery capable of charging and discharging.

As shown in FIG. 1, the conductive module 3 is formed to have a rectangular thin plate-shape as a whole by a rectangular thin plate-shaped conductive plate 4 (note that the conductive plate 4 also functions as a heat sink as described later), the rectangular thin plate-shaped battery stack plate 5 coupled to a right side of the conductive plate 4, and a rectangular thin plate-shaped battery stack plate 6 coupled to a left side of the conductive plate 4. The battery stack plate 5 and the battery stack plate 6 are coupled to each other with the conductive plate 4 interposed therebetween.

In the present specification, a plate thickness direction of the plate-shaped conductive plate 4 and the battery stack plates 5 and 6 is defined as the up-down direction, a longitudinal direction thereof is defined as the front-back direction, and a lateral direction thereof is defined as the left-right direction.

Figure 2:
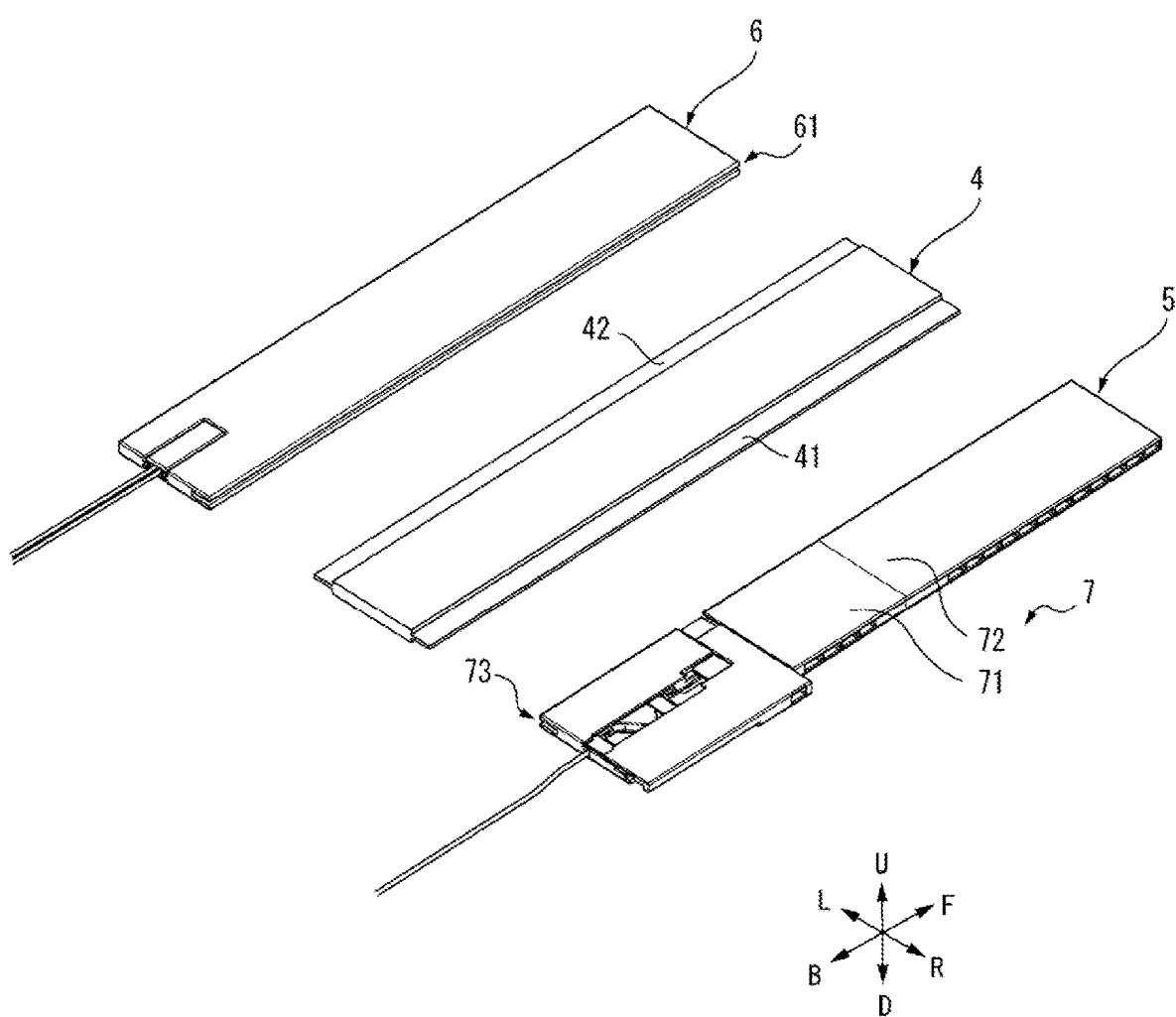
FIG. 2 is an exploded perspective view of a conductive module shown in FIG. 1.

Further, as shown in FIG. 2, the conductive plate 4 and the battery stack plate 5 are coupled to each other by fitting a flange portion (side edge portion) 41 provided at a right edge portion of the conductive plate 4 and extending in the front-back direction and a fitting groove 73 recessed in a left plate side face of the battery stack plate 5 and extending in the front-back direction. The conductive plate 4 and the battery stack plate 6 are coupled to each other by fitting a flange portion 42 provided at a left edge portion of the conductive plate 4 and extending in the front-back direction and a fitting groove 61 recessed in a right plate side face of the battery stack plate 6 and extending in the front-back direction.

The fitting groove 73 provided in the battery stack plate 5 is opened to the left direction, and the flange portion 41 is inserted into the fitting groove 73 from this opening, so that the fitting groove 73 and the flange portion 41 are fitted each other. In addition, the fitting groove 61 provided in the battery stack plate 6 is opened to the right direction, and the flange portion 42 is inserted into the fitting groove 61 from this opening, so that the fitting groove 61 and the flange portion 42 are fitted each other. That is, in the present specification, the left-right direction is a fitting direction.

In each of the conductive modules 3 positioned between the vertically adjacent power storage modules 2, the conductive plate 4 is in direct contact with the upper and lower power storage modules 2 as shown in FIG. 1. Therefore, the conductive plate 4 functions to perform conduction between a lower face of the upper power storage module 2 and an upper face of the lower power storage module 2, and functions as a heat sink that releases heat generated from the upper and lower power storage modules 2 to the outside.

Any one of a voltage detection unit, a temperature detection unit, a voltage and temperature detection unit, and a dummy unit, which will be described later, is applied to each of the conductive modules 3 positioned between the vertically adjacent power storage modules 2 as the battery stack plate 5 according to a specification of the battery stack 1.

First, a detailed configuration of the battery stack plate 5 will be described. As shown in FIGS. 1 and 2, the battery stack plate 5 includes a rectangular thin plate-shaped housing 7 made of resin. The housing 7 includes a rectangular thin plate-shaped first sub housing 71 and a rectangular thin plate-shaped second sub housing 72 that are obtained by dividing the housing 7 into two in the front-back direction (intersecting direction). The first sub housing 71 and the second sub housing 72 each have a coupling portion 74 (see FIGS. 3 to 6) for coupling the first sub housing 71 and the second sub housing 72 to each other.

In the present embodiment, as shown in FIGS. 3 to 6, the first sub housing 71 and the second sub housing 72 include any one of a voltage detection housing 75, a mirror product 76 (voltage detection housing) of the voltage detection housing 75, a temperature detection housing 77, and a dummy housing 78.

Figure 3:
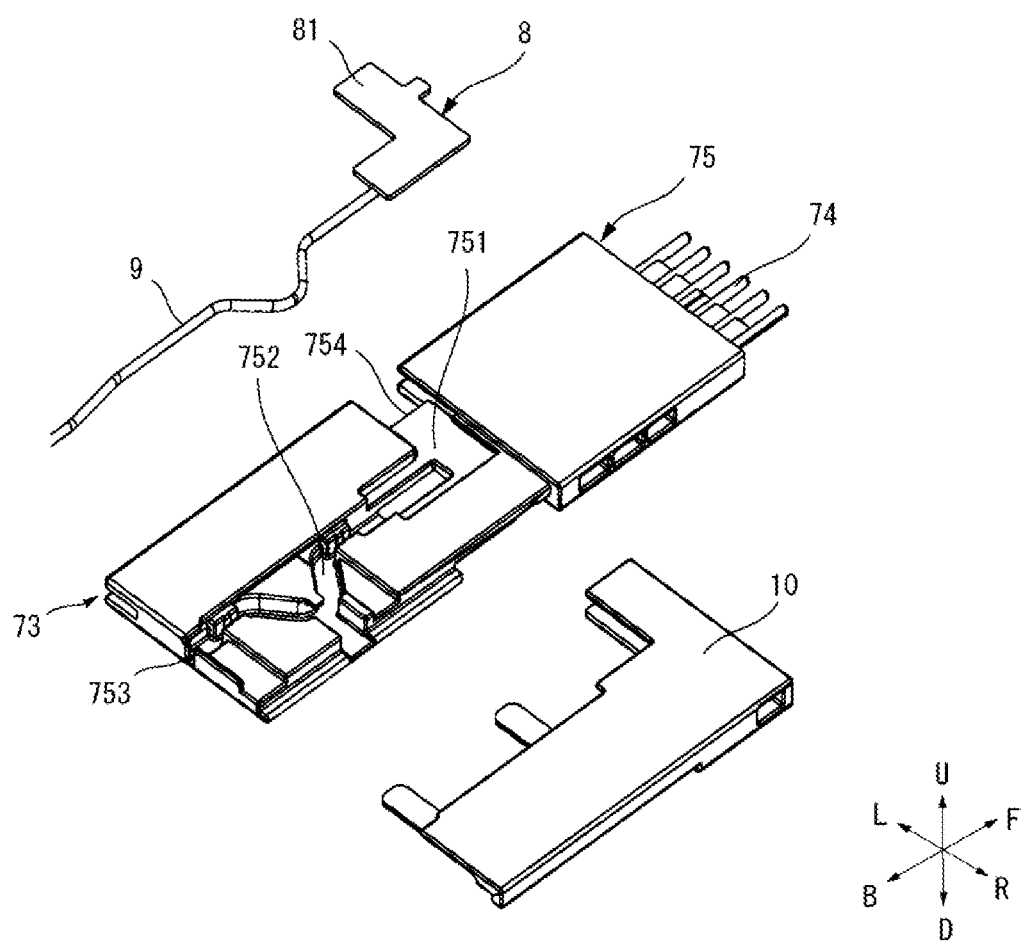
FIG. 3 is an exploded perspective view of a voltage detection housing used in the battery stack plate shown in FIG. 1.

The voltage detection housing 75 shown in FIG. 3 has a function of outputting a signal indicating a voltage of the power storage module 2 via an electric wire 9 connected to a voltage detection terminal 8. The voltage detection housing 75 is formed of a rectangular thin plate-shaped resin plate, and includes a half of the above-described fitting groove 73, a terminal accommodation recessed portion 751, an electric wire accommodation recessed portion 752, a pull-out port 753, and the coupling portion 74. The fitting groove 73 is provided on a left plate side face of the voltage detection housing 75.

The terminal accommodation recessed portion 751 is a recessed portion for accommodating the voltage detection terminal 8, and is recessed in an upper face of the resin plate. The electric wire accommodation recessed portion 752 is a recessed portion for accommodating the electric wire 9, and is recessed in the upper face of the resin plate. In the present embodiment, the pull-out port 753 is provided on a rear end surface of the voltage detection housing 75, and the electric wire 9 is pulled out from a rear end of the voltage detection housing 75. The coupling portion 74 is provided at a front end of the voltage detection housing 75. Details of the coupling portion 74 will be described later.

The voltage detection terminal 8 made of metal is formed by one metal plate being subjected to processing such as a pressing process. The voltage detection terminal 8 is fitted and accommodated in the terminal accommodation recessed portion 751 from above. The voltage detection terminal 8 is provided in an L-shape when viewed from the upper direction. In the voltage detection housing 75, a notch 754 is provided by partially cutting out the voltage detection housing 75, so that a conductive connection portion 81 with the conductive plate 4 is exposed from a lower side of the voltage detection terminal 8. As a result, when the fitting groove 73 provided in the voltage detection housing 75 and the flange portion 41 provided in the conductive plate 4 are fitted each other, the conductive connection portion 81 of the voltage detection terminal 8 accommodated in the voltage detection housing 75 and the flange portion 41 of the conductive plate 4 overlap and come into contact with each other in the up-down direction. The voltage detection terminal 8 and the conductive plate 4 are electrically connected by ultrasonic connection or the like of the conductive connection portion 81.

A cover 10 is attached to the above-described voltage detection housing 75 from the right. The cover 10 is a resin molded product and functions to cover and protect the voltage detection terminal 8 accommodated in the terminal accommodation recessed portion 751 and the electric wire 9 accommodated in the electric wire accommodation recessed portion 752 from above.

Figure 4:
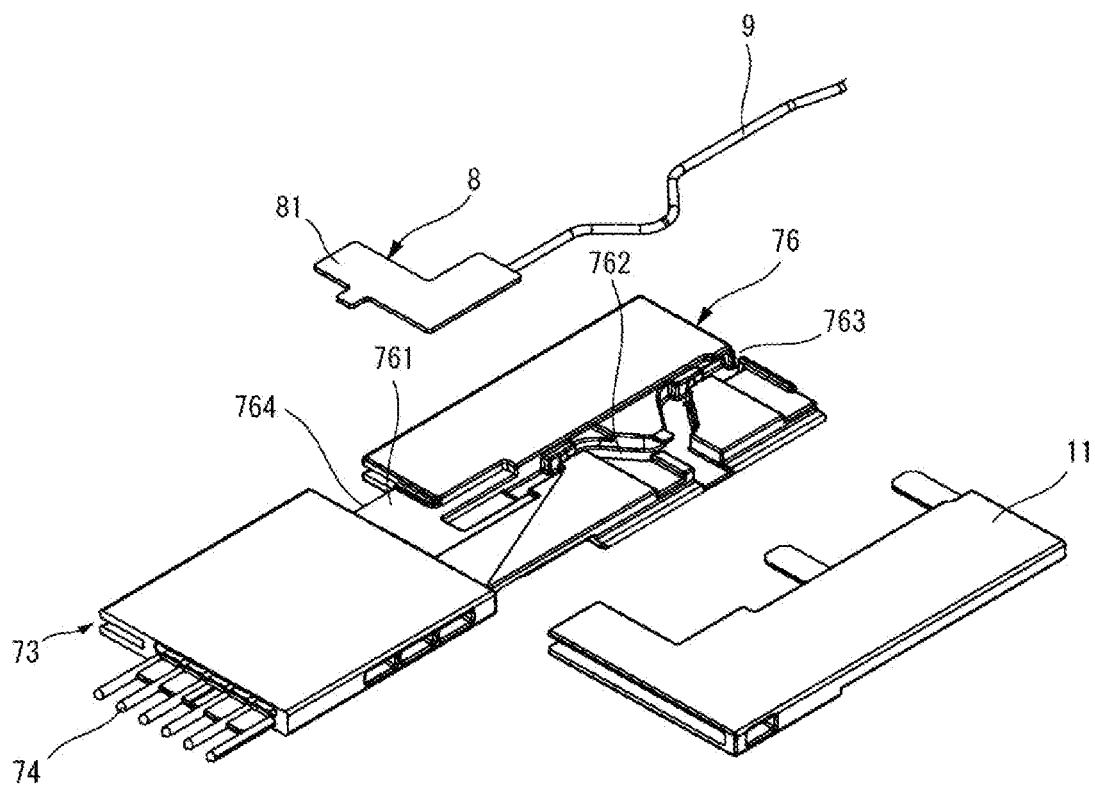
FIG. 4 is an exploded perspective view of a mirror product of the voltage detection housing used in the battery stack plate shown in FIG. 1.
Figure 4:
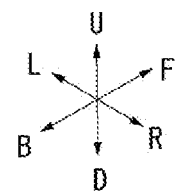

Similarly to the voltage detection housing 75, the mirror product 76 shown in FIG. 4 has the function of outputting the signal indicating the voltage of the power storage module 2 via the electric wire 9 connected to the voltage detection terminal 8. The mirror product 76 is formed of a rectangular thin plate-shaped resin plate, and includes a half of the above-described fitting groove 73, a terminal accommodation recessed portion 761, an electric wire accommodation recessed portion 762, a pull-out port 763, a notch 764, and the coupling portion 74. The fitting groove 73 is provided on a left plate side face of the mirror product 76.

The terminal accommodation recessed portion 761 is a recessed portion for accommodating the voltage detection terminal 8, and is recessed in an upper face of the resin plate. The voltage detection terminal 8 can be accommodated in the terminal accommodation recessed portion 761 in a state where the terminal is turned upside down from a state shown in FIG. 3. The electric wire accommodation recessed portion 762 is a recessed portion for accommodating the electric wire 9, and is recessed in the upper face of the resin plate. In the present embodiment, the pull-out port 763 is provided on a front end surface of the mirror product 76, and the electric wire 9 is pulled out from a front end of the mirror product 76. The coupling portion 74 is provided at a rear end of the mirror product 76. Details of the coupling portion 74 will be described later.

A portion of the above-described mirror product 76 excluding the coupling portion 74 has a mirror-inverted shape of a portion of the voltage detection housing 75 excluding the coupling portion 74.

A cover 11 is attached to the above-described mirror product 76 from the right. The cover 11 is a resin molded product and functions to cover and protect the voltage detection terminal 8 accommodated in the terminal accommodation recessed portion 761 and the electric wire 9 accommodated in the electric wire accommodation recessed portion 762 from above. The cover 11 has a mirror-inverted shape of the cover 10.

Figure 5:
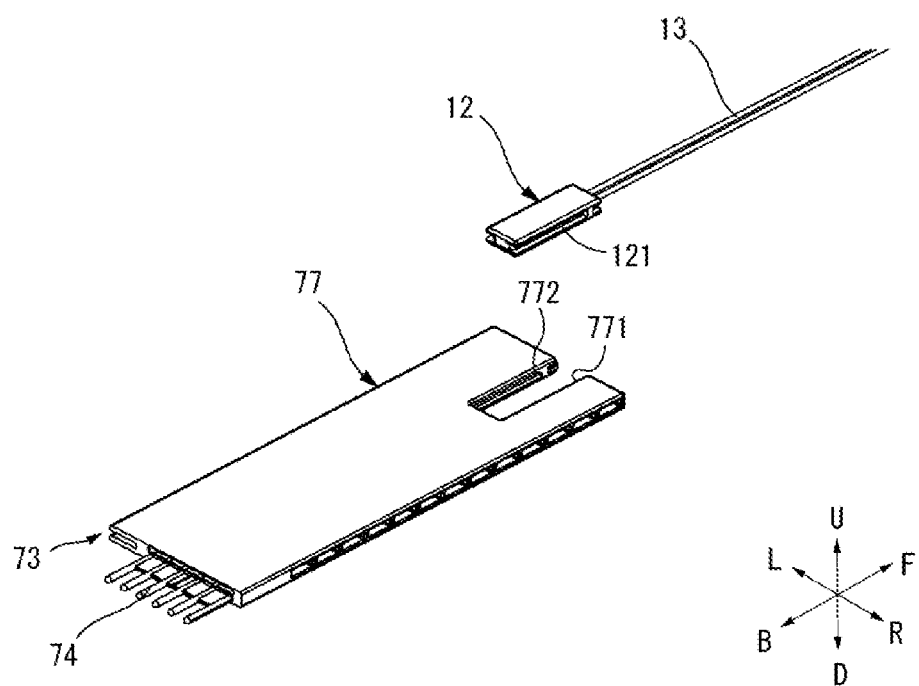
FIG. 5 is an exploded perspective view of a temperature detection housing used in the battery stack plate shown in FIG. 1.

The temperature detection housing 77 shown in FIG. 5 has a function of outputting a signal indicating a temperature of the power storage module 2 via an electric wire 13 connected to a temperature sensor 12. The temperature detection housing 77 is formed of a rectangular thin plate-shaped resin plate, and includes a half of the above-described fitting groove 73, a sensor accommodation portion 771, and the coupling portion 74. The fitting groove 73 is provided in a left side plate portion of the temperature detection housing 77.

The sensor accommodation portion 771 is provided by cutting out one end (front side in FIG. 5) of the temperature detection housing 77 in the front-back direction into a rectangular shape. Flange portions 772 extending in the front-back direction are provided on inner wall surfaces of the sensor accommodation portion 771 facing each other in the left-right direction. The temperature sensor 12 is provided in a substantially cubic shape, and slide grooves 121 into which the flange portions 772 are slidably inserted are provided on side faces facing each other in the left-right direction. The slide grooves 121 are provided along the front-back direction.

The coupling portion 74 is provided at the other end (rear end in FIG. 5) of the temperature detection housing 77 in the front-back direction. The coupling portion 74 will be described later. A portion of the temperature detection housing 77 excluding the coupling portion 74 is provided, such that the state shown in FIG. 5 and a state turned upside down from the state shown in FIG. 5 have mirror-inverted shapes.

Figure 6:
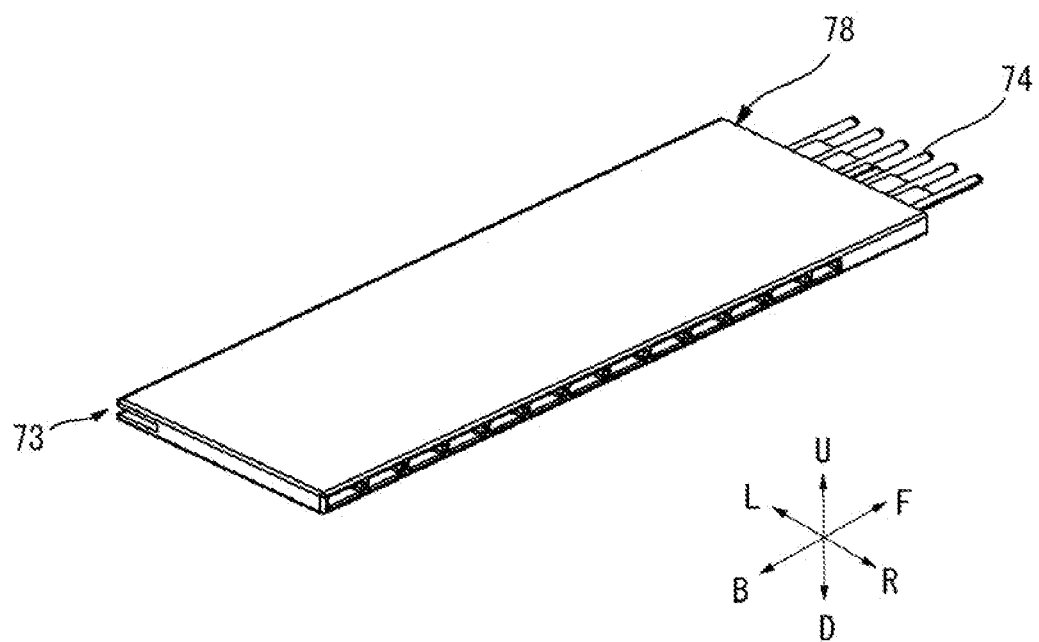
FIG. 6 is an exploded perspective view of a dummy housing used in the battery stack plate shown in FIG. 1.

The dummy housing 78 shown in FIG. 6 is formed of a rectangular thin plate-shaped resin plate, and the coupling portion 74 is provided at one end (rear end in FIG. 6) in the front-back direction. The dummy housing 78 is formed only of the resin plate, and neither the voltage detection terminal 8 nor the temperature sensor 12 is accommodated therein. A portion of the dummy housing 78 excluding the coupling portion 74 is provided, such that the state shown in FIG. 6 and a state turned upside down from the state shown in FIG. 6 have mirror-inverted shapes.

Figure 7A:
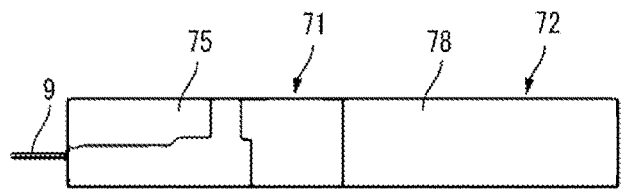
FIGS. 7A to 7H are diagrams showing a battery stack plate manufactured by combining the voltage detection housing, the temperature detection housing, and the dummy housing shown in FIGS. 4 to 6.

Next, a method for manufacturing the battery stack plate 5 will be described with reference to FIGS. 7A to 7H. First, when the battery stack plate 5 is used as the voltage detection unit and the electric wire 9 connected to the voltage detection terminal 8 is to be pulled out from the rear end, as shown in FIG. 7A, the voltage detection housing 75 is selected as the first sub housing 71, and the dummy housing 78 is selected as the second sub housing 72.

The voltage detection housing 75 is disposed such that the coupling portion 74 faces forward and the fitting groove 73 faces leftward. The dummy housing 78 is disposed such that the coupling portion 74 faces rearward and the fitting groove 73 faces leftward. That is, the dummy housing 78 is rotated by 180° about an axis along the left-right direction from the state of FIG. 6, and is disposed in a state of being turned upside down. Then, the coupling portions 74 of the voltage detection housing 75 and the dummy housing 78 are coupled to complete the battery stack plate 5.

Figure 7B:
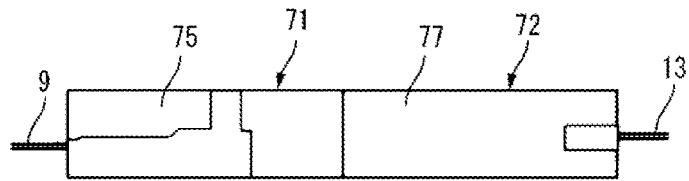

Next, when the battery stack plate 5 is used as the voltage and temperature detection unit, the electric wire 9 connected to the voltage detection terminal 8 is to be pulled out from the rear side, and the electric wire 13 connected to the temperature sensor 12 is to be pulled out from the front side, as shown in FIG. 7B, the voltage detection housing 75 is selected as the first sub housing 71, and the temperature detection housing 77 is selected as the second sub housing 72.

The voltage detection housing 75 is disposed such that the coupling portion 74 faces forward and the fitting groove 73 faces leftward. The temperature detection housing 77 is disposed such that the coupling portion 74 faces rearward and the fitting groove 73 faces leftward. That is, the temperature detection housing 77 is disposed in the same state as in FIG. 5. Then, the coupling portions 74 of the voltage detection housing 75 and the temperature detection housing 77 are coupled to complete the battery stack plate 5.

Figure 7C:
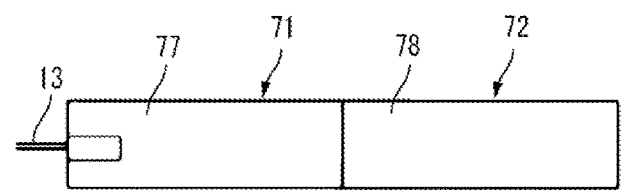

Next, when the battery stack plate 5 is used as the voltage detection unit and the electric wire 13 connected to the temperature sensor 12 is to be pulled out from the rear side, as shown in FIG. 7C, the temperature detection housing 77 is selected as the first sub housing 71, and the dummy housing 78 is selected as the second sub housing 72.

The temperature detection housing 77 is disposed such that the coupling portion 74 faces forward and the fitting groove 73 faces leftward. That is, the temperature detection housing 77 is rotated by 180° about the axis along the left-right direction from the state of FIG. 5, and is disposed in a state of being turned upside down. The dummy housing 78 is disposed such that the coupling portion 74 faces rearward and the fitting groove 73 faces leftward. Then, the coupling portions 74 of the temperature detection housing 77 and the dummy housing 78 are coupled to complete the battery stack plate 5.

Figure 7D:
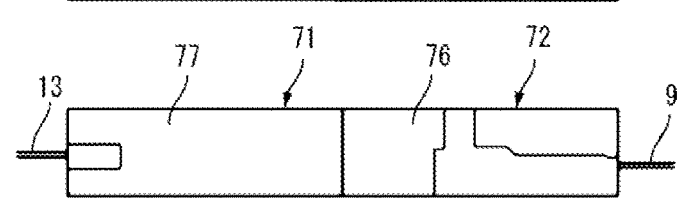

Next, when the battery stack plate 5 is used as the voltage and temperature detection unit, the electric wire 13 connected to the temperature sensor 12 is to be pulled out from the rear side, and the electric wire 9 connected to the voltage detection terminal 8 is to be pulled out from the front side, as shown in FIG. 7D, the temperature detection housing 77 is selected as the first sub housing 71, and the mirror product 76 is selected as the second sub housing 72.

The temperature detection housing 77 is disposed such that the coupling portion 74 faces forward and the fitting groove 73 faces leftward. The mirror product 76 is disposed such that the coupling portion 74 faces rearward and the fitting groove 73 faces leftward. That is, the mirror product 76 is disposed in the same state as in FIG. 4. Then, the coupling portions 74 of the temperature detection housing 77 and the mirror product 76 are coupled to complete the battery stack plate 5.

Figure 7E:
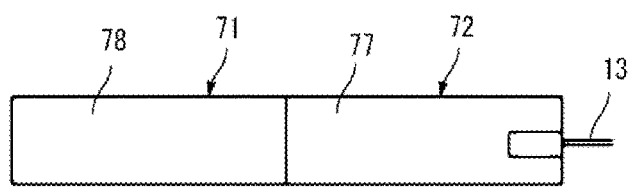

Next, when the battery stack plate 5 is used as the temperature detection unit and the electric wire 13 connected to the temperature sensor 12 is to be pulled out from the rear side, as shown in FIG. 7E, the dummy housing 78 is selected as the first sub housing 71, and the temperature detection housing 77 is selected as the second sub housing 72.

The dummy housing 78 is disposed such that the coupling portion 74 faces forward and the fitting groove 73 faces leftward. The temperature detection housing 77 is disposed such that the coupling portion 74 faces rearward and the fitting groove 73 faces leftward. Then, the coupling portions 74 of the dummy housing 78 and the temperature detection housing 77 are coupled to complete the battery stack plate 5.

Figure 7F:
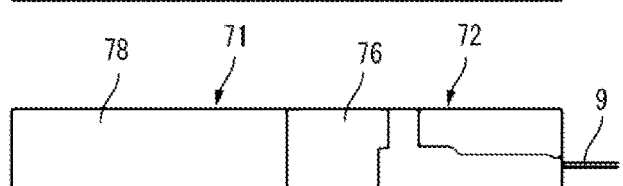

Next, when the battery stack plate 5 is used as the voltage detection unit and the electric wire 9 connected to the voltage detection terminal 8 is to be pulled out from the rear side, as shown in FIG. 7F, the dummy housing 78 is selected as the first sub housing 71, and the mirror product 76 is selected as the second sub housing 72.

The dummy housing 78 is disposed such that the coupling portion 74 faces forward and the fitting groove 73 faces leftward. The mirror product 76 is disposed such that the coupling portion 74 faces rearward and the fitting groove 73 faces leftward. Then, the coupling portions 74 of the dummy housing 78 and the mirror product 76 are coupled to complete the battery stack plate 5.

Figure 7G:
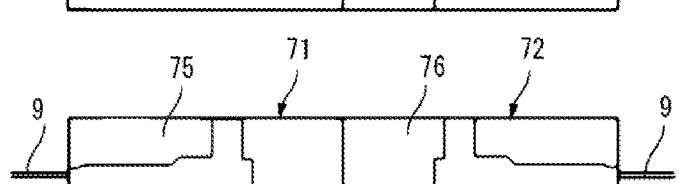

Next, when the battery stack plate 5 is used as the voltage detection unit and two voltage detection terminals 8 are to be accommodated for backup, as shown in FIG. 7G, the voltage detection housing 75 is selected as the first sub housing 71, and the mirror product 76 is selected as the second sub housing 72.

The voltage detection housing 75 is disposed such that the coupling portion 74 faces forward and the fitting groove 73 faces leftward. The mirror product 76 is disposed such that the coupling portion 74 faces the rear end and the fitting groove 73 faces leftward. Then, the coupling portions 74 of the voltage detection housing 75 and the mirror product 76 are coupled to complete the battery stack plate 5.

Figure 7H:
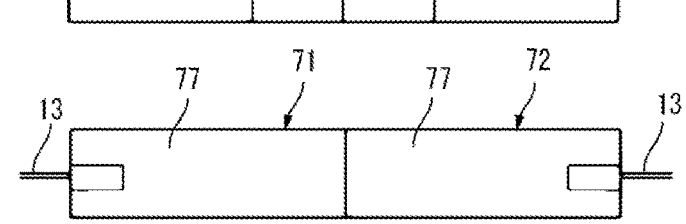

Next, when the battery stack plate 5 is used as the voltage detection unit and two temperature sensors 12 are to be accommodated for backup, as shown in FIG. 7H, the temperature detection housing 77 is selected as the first sub housing 71 and the second sub housing 72, and the mirror product 76 is selected as the second sub housing 72.

One of the two temperature detection housings 77 is disposed such that the coupling portion 74 faces forward and the fitting groove 73 faces leftward. The other one of the two temperature detection housings 77 is disposed such that the coupling portion 74 faces rearward and the fitting groove 73 faces leftward. Then, the coupling portions 74 of the two temperature detection housings 77 are coupled to complete the battery stack plate 5.

According to the above-described embodiment, the housing 7 of the battery stack plate 5 includes the first sub housing 71 and the second sub housing 72 that are obtained by dividing the housing 7 into two in the front-back direction, and the first sub housing 71 and the second sub housing 72 each include the coupling portion 74 for coupling to each other. The first sub housing 71 and the second sub housing 72 include any one of the voltage detection housing 75, the mirror product 76 thereof, the temperature detection housing 77, and the dummy housing 78.

In this manner, by combining the voltage detection housing 75, the mirror product 76, the temperature detection housing 77, and the dummy housing 78, eight types of battery stack plates 5 can be manufactured as shown in FIGS. 7A to 7H. In an example of related art, eight molds are required to manufacture eight types of battery stack plates 5, but in the present embodiment, eight types of battery stack plates 5 can be manufactured by forming the housings 75 to 78 using four molds and combining the housings 75 to 78. Therefore, versatility is high and it is possible to cope with various specifications of the battery stack 1.

Figure 8:
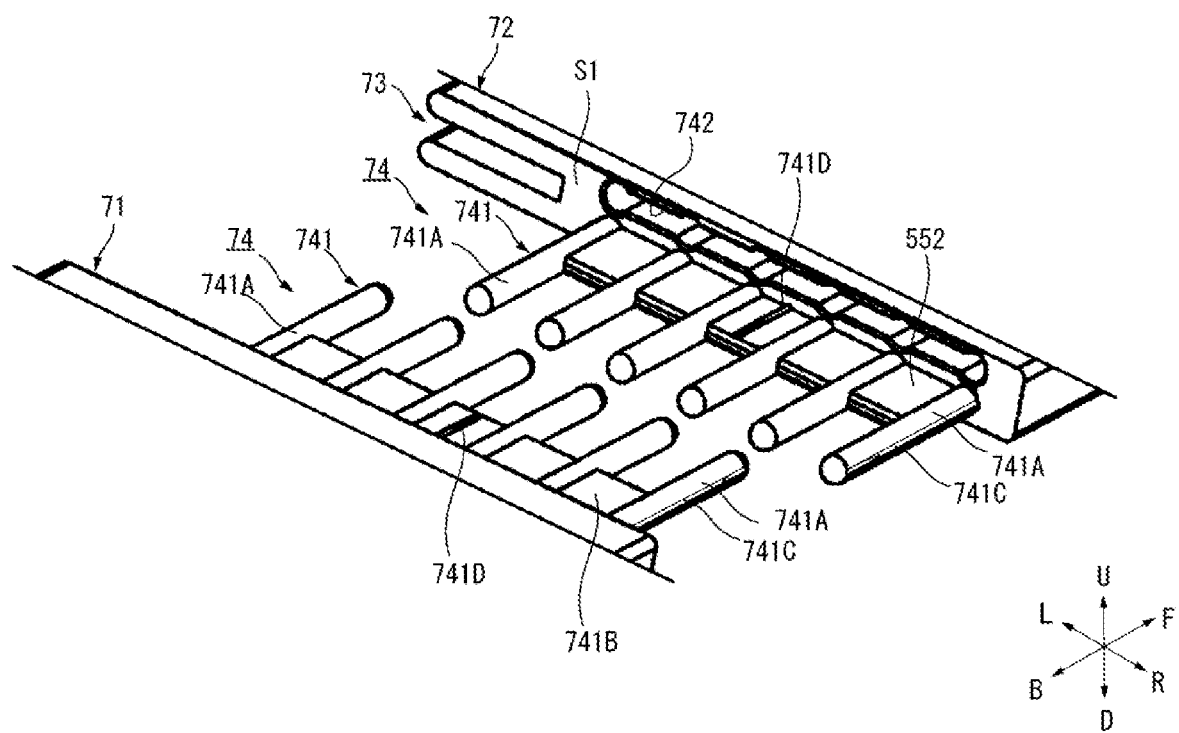
FIG. 8 is a partial perspective view of a coupling portion including a first sub housing and a second sub housing shown in FIG. 1.
Figure 9:
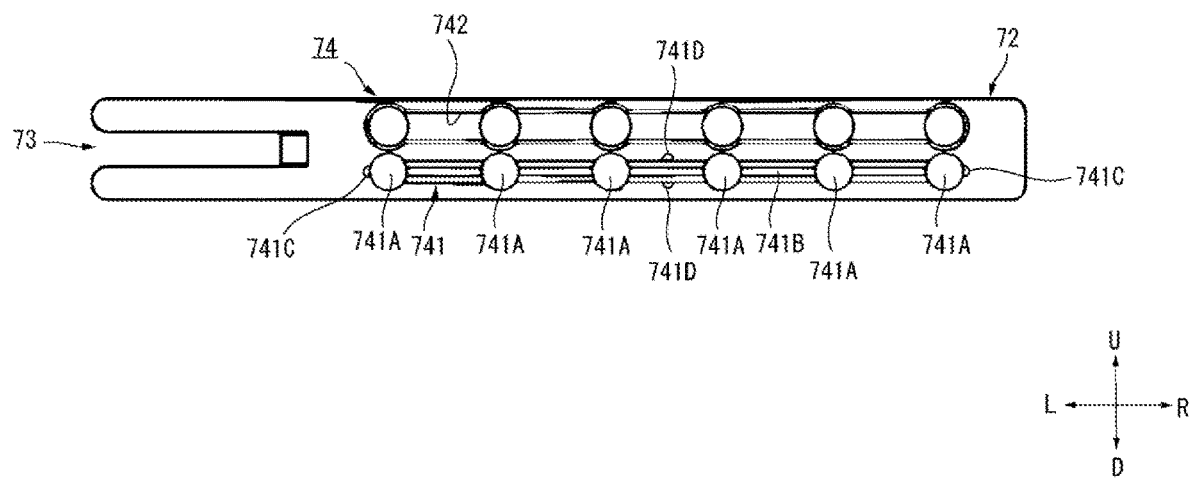
FIG. 9 is a side view of the second sub housing shown in FIG. 8 when viewed from a back end side.

Next, the coupling portions 74 of the first sub housing 71 and the second sub housing 72 will be described in detail. As shown in FIGS. 8 and 9, the coupling portion 74 includes a protruding portion 741 provided on coupling plate side face S1 on which the first sub housing 71 and the second sub housing 72 are coupled to each other, and a recessed portion 742 provided on the coupling plate side face S1 at a position shifted in the up-down direction. Then, the protruding portion 741 of the second sub housing 72 is press-fitted (inserted) into the recessed portion 742 of the first sub housing 71, and the protruding portion 741 of the first sub housing 71 is press-fitted (inserted) into the recessed portion 742 of the second sub housing 72, so that the first sub housing 71 and the second sub housing 72 are coupled in the front-back direction.

In the present embodiment, the protruding portion 741 is provided on an upper side of the coupling plate side face S1 of the first sub housing 71, and the recessed portion 742 is provided on a lower side of the coupling plate side face S1 of the first sub housing 71. The protruding portion 741 is provided on a lower side of the coupling plate side face S1 of the second sub housing 72, and the recessed portion 742 is provided on an upper side of the coupling plate side face S1 of the second sub housing 72.

The protruding portion 741 include a plurality of pins 741A disposed side by side in the left-right direction, a flat plate portion 741B coupling the plurality of pins 741A, first press-fit ribs 741C provided to press-fit the protruding portion 741 into the recessed portion 742, and second press-fit ribs 741D. In the present embodiment, six pins 741A are provided side by side. The flat plate portion 741B is provided so as to be perpendicular to the up-down direction, and is provided so as to couple roots (coupling plate side face S1 side) of the plurality of pins 741A.

The first press-fit ribs 741C are provided on the pins 741A at both ends in the left-right direction and protrude outward in the left-right direction to be press-fitted into the recessed portion 742 in the left-right direction. The first press-fit ribs 741C are provided continuously from the roots to distal ends of the pins 741A on both left and right sides. Further, a distal end portion of the first press-fit rib 741C is tapered such that a height of the rib decreases toward the distal end. Further, the first press-fit ribs 741C and the flat plate portion 741B are provided at the same position in the up-down direction.

The second press-fit ribs 741D protrude from both surfaces of the flat plate portion 741B in the up-down direction and are press-fitted into the recessed portion 742 in the up-down direction. The second press-fit rib 741D is disposed at a center of the flat plate portion 741B in the left-right direction. The second press-fit ribs 741D are provided continuously from roots to distal ends of the flat plate portion 741B. Further, a distal end portion of the second press-fit rib 741D is tapered such that a height of the rib decreases toward the distal end.

According to the embodiment described above, the coupling portion 74 of the first sub housing 71 and the second sub housing 72 includes the protruding portion 741 provided on the coupling plate side face S1 on which the first sub housing 71 and the second sub housing 72 are coupled to each other, and the recessed portion 742 provided on the coupling plate side face S1 at a position shifted from the protruding portion 741 in the up-down direction. Then, the protruding portion 741 of the second sub housing 72 is inserted into the recessed portion 742 of the first sub housing 71, and the protruding portion 741 of the first sub housing 71 is inserted into the recessed portion 742 of the second sub housing 72, so that the first sub housing 71 and the second sub housing 72 are coupled.

According to the above configuration, the first sub housing 71 in which the protruding portion 741 is provided on the upper side and the recessed portion 742 is provided on the lower side can be turned upside down to form the second sub housing 72 in which the recessed portion 742 is provided on the upper side and the protruding portion 741 is provided on the lower side. Therefore, if shapes obtained by turning a portion other than the coupling portion 74, such as the temperature detection housing 77 and the dummy housing 78, upside down are mirror shapes, the first sub housing 71 and the second sub housing 72 can have the same shape, and it is possible to reduce the number of molds and improve the versatility.

According to the embodiment described above, the protruding portion 741 includes the plurality of pins 741A disposed side by side along the left-right direction and the flat plate portion 741B coupling the plurality of pins 741A. Thus, the flat plate portion 741B can further reinforce the pins 741A.

According to the above-described embodiment, the protruding portion 741 includes the first press-fit ribs 741C that are provided on the pins 741A at both ends in the left-right direction, protrude outward in the left-right direction, and are press-fitted into the recessed portion 742 in the left-right direction, and the first press-fit ribs 741C and the flat plate portion 741B are provided at the same position in the up-down direction. According to the above configuration, the protruding portion 741 can be press-fitted into the recessed portion 742 in the left-right direction, and the first sub housing 71 and the second sub housing 72 can be coupled more firmly.

According to the above-described embodiment, the protruding portion 741 includes the second press-fit ribs 741D that protrude from both surfaces of the flat plate portion 741B in the up-down direction and are press-fitted into the recessed portion 742 in the up-down direction, and the second press-fit rib 741D is disposed at the center of the flat plate portion 741B in the left-right direction. Thus, the protruding portion 741 can be press-fitted into the recessed portion 742 in the up-down direction, and the first sub housing 71 and the second sub housing 72 can be coupled more firmly.

It should be noted that the present disclosure is not limited to the above embodiment, and modifications, improvements, and the like can be made as appropriate. In addition, materials, shapes, dimensions, numbers, arrangement positions, and the like of the respective constituent elements in the above embodiment are optionally selected and are not limited as long as the present disclosure can be implemented.

According to the above-described embodiment, the first sub housing 71 and the second sub housing 72 include any one of the voltage detection housing 75, the mirror product 76, the temperature detection housing 77, and the dummy housing 78, but the present disclosure is not limited thereto. For example, the first sub housing 71 and the second sub housing 72 may include the sensor accommodation portion that accommodates the temperature sensor 12, a housing in which the terminal accommodation recessed portion that accommodates the voltage detection terminal 8 and the electric wire accommodation recessed portion that accommodates the electric wire 9 are formed, and a mirror product thereof.

Further, according to the above-described embodiment, as the coupling portion 74, the protruding portion 741 is press-fitted into the recessed portion 742, but the present disclosure is not limited thereto. As long as the coupling portion 74 can couple the first sub housing 71 and the second sub housing 72, the protruding portion 741 may be simply inserted into the recessed portion 742.

In addition, according to the above-described embodiment, the temperature detection housing 77 and the dummy housing 78 can be implemented as either the first sub housing 71 or the second sub housing 72, but the present disclosure is not limited thereto. For example, the coupling portion 74 of the first sub housing 71 may only include the protruding portion 741, the coupling portion 74 of the second sub housing 72 may only include the recessed portion 742, and the housings 77 and 78 that can be selected as the first sub housing 71 and the housings 77 and 78 that can be selected as the second sub housing 72 may be provided in different shapes.

Similarly to the battery stack plate 5, the battery stack plate 6 may include the first sub housing and the second sub housing.

Here, features of the battery stack plate and the method for manufacturing the battery stack plate according to the embodiment of the present disclosure described above will be briefly summarized and listed in [1] to [6] below. [1] A battery stack plate (5) including:
- a plate-shaped housing (7) in which a fitting groove (73) is provided in a side plate surface, the fitting groove (73) being configured to fit a side edge portion (41) of a conductive plate (4) disposed between a plurality of stacked power storage modules (2), in which
- the housing (7) includes a first sub housing (71) and a second sub housing (72) that are obtained by dividing the housing (7) into two in an intersecting direction (front-back direction) intersecting with both a fitting direction (left-right direction) and a plate thickness direction (up-down direction),
- the first sub housing (71) and the second sub housing (72) each have a coupling portion (74) that couples the first sub housing (71) and the second sub housing (72) to each other,
- the coupling portion (74) includes a protruding portion (741) provided on a coupling plate side face (S1) on which the first sub housing (71) and the second sub housing (72) are coupled to each other, and a recessed portion (72) provided on the coupling plate side face (S1) at a position shifted from the protruding portion (741) in the plate thickness direction, and
- the protruding portion (741) of the second sub housing (72) is inserted into the recessed portion (742) of the first sub housing (71), and the protruding portion (741) of the first sub housing (71) is inserted into the recessed portion (742) of the second sub housing (72) to couple the first sub housing (71) and the second sub housing (72).

According to the configuration of [1], the battery stack plate (5) can be manufactured by combining two housings selected from a plurality of types of housings as the first sub housing (71) and the second sub housing (72). Therefore, versatility is high and it is possible to cope with various specifications of the battery stack (1). Alternatively, the first sub housing (71) in which the protruding portion (741) is provided on one side in the plate thickness direction and the recessed portion (742) is provided on the other side in the plate thickness direction can be turned upside down to form the second sub housing (72) in which the recessed portion (742) is provided on one side in the plate thickness direction and the protruding portion (741) is provided on the other side in the plate thickness direction. Therefore, if shapes obtained by turning a portion other than the coupling portion (74) upside down in the plate thickness direction are mirror shapes, the first sub housing (71) and the second sub housing (72) can have the same shape, and it is possible to further reduce the number of molds and improve the versatility.

[2] The battery stack plate (5) according to [1], in which
- the protruding portion (741) includes a plurality of pins (741A) disposed side by side along the fitting direction, and a flat plate portion (741B) coupling the plurality of pins (741A).

According to the configuration of [2], the flat plate portion (741B) can further reinforce the pins (741A).

[3] The battery stack plate (5) according to [2], in which
- the protruding portion (741) includes first press-fit ribs (741C) that are provided on the pins (741A) at both ends in the fitting direction, protrude outward in the fitting direction, and are press-fitted into the recessed portion (742) in the fitting direction, and
- the first press-fit ribs (741C) and the flat plate portion (741B) are provided at the same position in the plate thickness direction.

According to the configuration of [3], the protruding portion (741) can be press-fitted into the recessed portion (742) in the fitting direction, and the first sub housing (71) and the second sub housing (72) can be coupled more firmly.

[4] The battery stack plate (5) according to [2] or [3], in which
- the protruding portion (741) includes second press-fit ribs (741D) that protrude from both surfaces of the flat plate portion (741B) in the plate thickness direction and are press-fitted into the recessed portion (742) in the plate thickness direction, and
- the second press-fit rib (741D) is disposed at a center of the flat plate portion (741B) in the fitting direction.

According to the configuration of [4], the protruding portion (741) can be press-fitted into the recessed portion (742) in the plate thickness direction, and the first sub housing (71) and the second sub housing (72) can be coupled more firmly.

[5] A battery stack plate (5) including:
- a plate-shaped housing (7) in which a fitting groove (73) that fits a side edge portion (41) of a conductive plate (4) disposed between a plurality of stacked power storage modules (2) is provided in a side plate surface, in which the housing (7) includes a first sub housing (71) and a second sub housing (72) that are obtained by dividing the housing (7) into two in an intersecting direction (front-back direction) intersecting with both a fitting direction (left-right direction) and a plate thickness direction (up-down direction), the first sub housing (71) and the second sub housing (72) each have a coupling portion (74) that couples the first sub housing (71) and the second sub housing (72) to each other, the first sub housing (71) and the second sub housing (72) include any one of a voltage detection housing (75, 76) including a terminal accommodation recessed portion (751, 761) that accommodates a voltage detection terminal (8) to be conductively connected to the conductive plate (4), an electric wire accommodation recessed portion (752, 762) that accommodates an electric wire (9) to be conductively connected to the voltage detection terminal (8), and a pull-out port (753, 763) from which the electric wire (9) is pulled out to the outside, a temperature detection housing (77) including a sensor accommodation portion (771) that accommodates a temperature sensor (12), and a dummy housing (78) in which none of the voltage detection terminal (8), the electric wire (9), and the temperature sensor (12) is accommodated.

According to the configuration of [5], by combining the voltage detection housings (75, 76), the temperature detection housing (77), and the dummy housing (78), the battery stack plate (5) can be manufactured. Therefore, versatility is high and it is possible to cope with various specifications of the battery stack (1).

[6] A method for manufacturing a plate-shaped battery stack plate (5) in which a fitting groove (73) that fits a side edge portion (41) of a conductive plate (4) disposed between a plurality of stacked power storage modules (2) is provided in a side plate surface, the method for manufacturing the battery stack plate (5) including:

manufacturing a voltage detection housing including a terminal accommodation recessed portion (761) that accommodates a voltage detection terminal (8) to be conductively connected to the conductive plate (4), an electric wire accommodation recessed portion (762) that accommodates an electric wire (9) to be conductively connected to the voltage detection terminal (8), and a pull-out port from which the electric wire (9) is pulled out to the outside, a temperature detection housing including a sensor accommodation portion that accommodates a temperature sensor, and a dummy housing in which none of the voltage detection terminal (8), the electric wire (9), and the temperature sensor is accommodated; and selecting two housings from the voltage detection housing, the temperature detection housing, and the dummy housing, and coupling the two selected housings in an intersecting direction intersecting with both a fitting direction and a plate thickness direction.

According to the configuration of [6], by combining the voltage detection housings (75, 76), the temperature detection housing (77), and the dummy housing (78), the battery stack plate (5) can be manufactured. Therefore, versatility is high and it is possible to cope with various specifications of the battery stack (1).

What is claimed is:

1. A battery stack plate comprising:

a plate-shaped housing in which a fitting groove is provided in a side plate surface, the fitting groove being configured to fit a side edge portion of a conductive plate disposed between a plurality of stacked power storage modules, wherein the housing includes a first sub housing and a second sub housing that are obtained by dividing the housing into two in an intersecting direction intersecting with both a fitting direction and a plate thickness direction, the first sub housing and the second sub housing each have a coupling portion that couples the first sub housing and the second sub housing to each other, the coupling portion includes a protruding portion provided on a coupling plate side face on which the first sub housing and the second sub housing are coupled to each other, and a recessed portion provided on the coupling plate side face at a position shifted from the protruding portion in the plate thickness direction, and the protruding portion arranged on the second sub housing is inserted into the recessed portion arranged on the first sub housing, and the protruding portion arranged on the first sub housing is inserted into the recessed portion arranged on the second sub housing to couple the first sub housing and the second sub housing.

2. The battery stack plate according to claim 1, wherein the protruding portion includes a plurality of pins disposed side by side along the fitting direction, and a flat plate portion coupling the plurality of pins.

3. The battery stack plate according to claim 2, wherein the protruding portion includes first press-fit ribs that are provided on the pins at both ends in the fitting direction, that protrude outward in the fitting direction, and that are press-fitted into the recessed portion in the fitting direction, and the first press-fit ribs and the flat plate portion are provided at the same position in the plate thickness direction.

4. The battery stack plate according to claim 2, wherein the protruding portion includes second press-fit ribs that protrude from both surfaces of the flat plate portion in the plate thickness direction and that are press-fitted into the recessed portion in the plate thickness direction, and the second press-fit rib is disposed at a center of the flat plate portion in the fitting direction.

5. A battery stack plate comprising:

a plate-shaped housing in which a fitting groove is provided in a side plate surface, the fitting groove being configured to fit a side edge portion of a conductive plate disposed between a plurality of stacked power storage modules, wherein the housing includes a first sub housing and a second sub housing that are obtained by dividing the housing into two in an intersecting direction intersecting with both a fitting direction and a plate thickness direction, the first sub housing and the second sub housing each have a coupling portion that couples the first sub housing and the second sub housing to each other, the first sub housing and the second sub housing include any one of a voltage detection housing having a terminal accommodation recessed portion that accommodates a voltage detection terminal to be conductively connected to the conductive plate, an electric wire accommodation recessed portion that accommodates an electric wire to be conductively connected to the voltage detection terminal, and a pull-out port from which the electric wire is pulled out to the outside, a temperature detection housing having a sensor accommodation portion that accommodates a temperature sensor, and a dummy housing in which none of the voltage detection terminal, the electric wire, and the temperature sensor is accommodated.

6. A method for manufacturing a plate-shaped battery stack plate in which a fitting groove is provided in a side plate surface, the fitting groove being configured to fit a side edge portion of a conductive plate disposed between a plurality of stacked power storage modules, the method for manufacturing the battery stack plate comprising:

manufacturing a voltage detection housing having a terminal accommodation recessed portion that accommodates a voltage detection terminal to be conductively connected to the conductive plate, an electric wire accommodation recessed portion that accommodates an electric wire to be conductively connected to the voltage detection terminal, and a pull-out port from which the electric wire is pulled out to the outside, a temperature detection housing having a sensor accommodation portion that accommodates a temperature sensor, and a dummy housing in which none of the voltage detection terminal, the electric wire, and the temperature sensor is accommodated; and selecting two housings from the voltage detection housing, the temperature detection housing, and the dummy housing, and coupling the two selected housings in an intersecting direction intersecting with both a fitting direction and a plate thickness direction.

\* \* \* \* \*